United States Patent [19]
Takahashi et al.

[11] Patent Number: 5,925,709
[45] Date of Patent: Jul. 20, 1999

[54] METHOD FOR THE PREPARATION OF SILICONE RUBBER

[75] Inventors: Masaharu Takahashi; Minoru Igarashi; Tsutomu Nakamura; Atsushi Yaginuma, all of Usui-gun, Japan

[73] Assignee: Shin-etsu Chemical Co., Ltd., Japan

[21] Appl. No.: 08/919,266

[22] Filed: Aug. 28, 1997

[30] Foreign Application Priority Data

Aug. 29, 1996 [JP] Japan .................................. 8-247311

[51] Int. Cl.⁶ ........................................ C08K 3/00
[52] U.S. Cl. ..................... 524/493; 524/492; 524/494
[58] Field of Search ................................ 524/492, 493, 524/494

[56] References Cited

U.S. PATENT DOCUMENTS

| | | | |
|---|---|---|---|
| 5,118,754 | 6/1992 | Miyakoshi et al. | 524/731 |
| 5,198,171 | 3/1993 | Kasahara et al. | 264/211.23 |
| 5,563,203 | 10/1996 | Yoshino et al. | 524/493 |
| 5,679,727 | 10/1997 | Griffith et al. | 523/213 |

FOREIGN PATENT DOCUMENTS

| | | |
|---|---|---|
| 0 361 921 | 4/1990 | European Pat. Off. . |
| 0 669 376 | 8/1995 | European Pat. Off. . |
| 0 798 342 | 10/1997 | European Pat. Off. . |

OTHER PUBLICATIONS

European Search Report, EP 97 30 6663, Jan. 9, 1998.

*Primary Examiner*—Edward J. Cain
*Attorney, Agent, or Firm*—Miller, White, Zelano & Branigan, P.C.

[57] ABSTRACT

A silicone rubber is prepared from a silicone rubber compound comprising (A) an organopolysiloxane having an average degree of polymerization of at least 100, (B) a reinforcing silica filler, and (C) an organohydrogenpolysiloxane by mixing component (C) with components (A) and (B) and heating them at a temperature of at least 100° C. to form the silicone rubber compound, adding an organic peroxide or a platinum group metal catalyst to the compound, and crosslinking the compound. The silicone rubber exhibits a minimal difference in physical properties between primary vulcanization and secondary vulcanization.

10 Claims, No Drawings

METHOD FOR THE PREPARATION OF SILICONE RUBBER

BACKGROUND OF THE INVENTION

1. Field of the Invention

This invention relates to a method for preparing a silicone rubber which exhibits a minimal difference in physical properties including hardness, tensile strength, elongation, restitution, and compression set between primary vulcanization and secondary vulcanization so that secondary vulcanization may be omitted.

2. Prior Art

In general, silicone rubber is improved in weather resistance, durability, heat resistance, physiological inertness, coloring, etc. and thus used in a wide variety of fields including building materials, electric and electronic parts, business machine parts, automobile parts, and medical equipment parts. Molded silicone rubber parts for use in these applications are often produced by various molding procedures including compression molding, extrusion molding and injection molding during which they are subject to primary vulcanization. Secondary vulcanization is then effected for stabilizing physical properties. In many cases, physical properties such as hardness, tensile strength, elongation, resilience, and compression set largely change between primary vulcanization and secondary vulcanization. Such changes are undesirable from the standpoint of stabilizing the properties of molded parts.

Prior art methods for producing silicone rubber experiencing a little change of physical properties between primary vulcanization and secondary vulcanization are by increasing the content of an alkenyl group serving as a crosslinking site in the polymer, by blending an alkenyl group-containing silane or siloxane, by effecting heat treatment in the presence of a minor amount of a silanol group condensing catalyst, and by surface modifying a reinforcing filler.

These methods, however, have several drawbacks. For example, when the content of an alkenyl group serving as a crosslinking site in the polymer is increased or when an alkenyl group-containing silane or siloxane is blended, the crosslinked silicone rubber would have a significantly increased hardness or reduced elongation. When heat treatment is effected in the presence of a minor amount of a silanol group condensing catalyst, the residual catalyst can detract from heat resistance and exacerbate the processability of unvulcanized rubber compound. The surface modification of a reinforcing filler is effective to some extent, but not to a fully satisfactory extent and adds to the cost of manufacture.

SUMMARY OF THE INVENTION

Therefore, an object of the present invention is to provide a simple method for producing a silicone rubber which exhibits a minimal difference in physical properties between primary vulcanization and secondary vulcanization, without giving rise to the above-mentioned problems, and which may omit secondary vulcanization.

We have found that in a process of preparing a silicone rubber by curing a silicone rubber compound of the organic peroxide curing type or addition reaction curing type comprising (A) an organopolysiloxane of the following general compositional formula (1):

$$R^1_a SiO_{(4-a)/2} \tag{1}$$

wherein $R^1$ is a substituted or unsubstituted monovalent hydrocarbon group, 0.001 to 0.5 mol % of $R^1$ being an alkenyl group, and letter a is a positive number of 1.95 to 2.05, the organopolysiloxane having an average degree of polymerization of at least 100, and (B) a reinforcing silica filler having a specific surface area of at least 50 $m^2/g$ as measured by a BET method, when (C) an organohydrogenpolysiloxane of the following general compositional formula (2):

$$R^2_b H_c SiO_{(4-b-c)/2} \tag{2}$$

wherein $R^2$ is a substituted or unsubstituted monovalent hydrocarbon group, and letters b and c are positive numbers satisfying $1 \leq b \leq 2$, $0.1 \leq c \leq 1.2$, and $1.8 \leq b+c \leq 2.2$ is mixed with components (A) and (B) and heated together at a temperature of at least 100° C., preferably 160 to 300° C., quite unexpectedly, there is obtained a silicone rubber compound which exhibits a minimal difference in physical properties of silicone rubber between primary vulcanization and secondary vulcanization, despite the fact that when the same organohydrogenpolysiloxane is mixed without heat treatment, the resulting silicone rubber compound exhibits a substantial difference in physical properties between primary vulcanization and secondary vulcanization. Since a silicone rubber having improved physical properties is obtained through only primary vulcanization, secondary vulcanization can be omitted.

It is well known in the art to blend organohydrogenpolysiloxane in silicone rubber compositions. For example, JP-B 27180/1977 discloses an atmospheric pressure hot air vulcanization type organopolysiloxane composition which is improved in cured properties and especially eliminates a need for secondary vulcanization. This composition uses an organohydrogenpolysiloxane in combination with a calcium compound. In this composition, however, the calcium compound must be added in order to prevent heat resistance from lowering by blooming of decomposed residues of a vulcanizing agent, and the organohydrogenpolysiloxane is post added without heat treatment. Where an acyl organic peroxide is used, little change of hardness occurs, but a substantial change of compression set occurs between primary vulcanization and secondary vulcanization. This technique cannot be applied to transparent parts. Also JP-B 52671/1984, 45099/1980, and 8148/1988 disclose compositions which are improved in yellowing resistance, mold release and tear strength. In these compositions, organohydrogenpolysiloxane is post added without heat treatment. In these patent publications, no reference is made to the object of the present invention. Further JP-B 26782/1988 discloses an organic peroxide curing type composition comprising an organohydrogenpolysiloxane, polysilalkylenesiloxane, polyphenylenesiloxane, and iron fatty acid. Although it is described that the order of blending is not critical, all Examples use the procedure that a base compound is first prepared and an organohydrogenpolysiloxane is post added without heat treatment. JP-A 300962/1992 discloses that a polyorganohydrogensiloxane having at least one hydroxy group or alkoxy group in a molecule, especially hydroxy groups or alkoxy groups at both ends is mixed and heated with a polyorganosiloxane and silica in order to inhibit discoloration upon vulcanization. It also discloses as a comparative example that a polyorganosiloxane, polyorganohydrogensiloxane having no hydroxy or alkoxy group and end-blocked with trimethyl silyl groups, polyorganosiloxane having hydroxy group at both ends, and silica are mixed and heated together. However, when an alkenyl group-containing organopolysiloxane is mixed with silica in the presence of a polyorganosiloxane or polyorganohydrogensiloxane having hydroxy or alkoxy groups at both ends, secondary vulcanization is required.

We have found that by mixing and heating an organohydrogenpolysiloxane having no hydroxy or alkoxy groups with an alkenyl group-containing organopolysiloxane and a reinforcing filler at a temperature of at least 100° C., preferably 160 to 130° C., the difference in physical properties of the resulting silicone rubber between primary vulcanization and secondary vulcanization is significantly reduced.

Accordingly, the invention provides a method for preparing a silicone rubber from a silicone rubber compound comprising (A) 100 parts by weight of an organopolysiloxane of the general compositional formula (1) having an average degree of polymerization of at least 100, preferably 2,000 to 10,000

(B) 5 to 200 parts by weight of a reinforcing silica filler having a specific surface area of at least 50 m$^2$/g as measured by a BET method, and (C) 0.1 to 10 parts by weight of an organohydrogenpolysiloxane of the general compositional formula (2), the method comprising the steps of mixing component (C) with components (A) and (B) and heating them at a temperature of at least 100° C. to form the silicone rubber compound, adding an organic peroxide or a platinum group metal catalyst to the compound, and crosslinking the compound.

DETAILED DESCRIPTION OF THE INVENTION

Component (A) of the silicone rubber compound the present invention addresses is an organopolysiloxane of the following general compositional formula (1):

$$R^1_a SiO_{(4-a)/2} \qquad (1)$$

wherein $R^1$ is a substituted or unsubstituted monovalent hydrocarbon group, 0.001 to 0.5 mol % of $R^1$ being an alkenyl group, and letter a is a positive number of 1.95 to 2.05. The organopolysiloxane has an average degree of polymerization of at least 100.

More particularly, $R^1$ is a substituted or unsubstituted monovalent hydrocarbon group preferably having 1 to 10 carbon atoms, more preferably 1 to 6 carbon atoms. It is essential that an alkenyl group be contained in a proportion of 0.001 to 0.5 mol %, preferably 0.01 to 0.3 mol % of the entire $R^1$ groups. Examples of the alkenyl group include vinyl, allyl and butenyl, with the vinyl being preferred. If the proportion of alkenyl group is too low, the resulting composition would be less curable. If the proportion of alkenyl group is too high, the resulting cured part would be low in physical properties such as tensile strength, tear strength and elongation.

The groups represented by $R^1$ other than the alkenyl group include hydrocarbon groups, for example, alkyl groups such as methyl, ethyl, propyl, butyl, pentyl, hexyl, octyl, decyl, and dodecyl; aryl groups such as phenyl and tolyl; and aralkyl groups such as benzyl and β-phenylethyl; and substituted ones of these hydrocarbon groups wherein all or some of the hydrogen atoms are replaced by halogen atoms, cyano or other groups, such as 3,3,3-trifluoropropyl and cyanoethyl. Methyl is preferred in most cases. Where freeze resistance, radiation resistance and transparency are to be imparted, it is preferred that phenyl be contained in a proportion of 2 to 20 mol % of the entire $R^1$ groups. Where oil resistance and gasoline resistance are to be imparted, it is preferred that cyanoethyl, 3,3,3-trifluoropropyl, etc. be contained in a proportion of 5 to 70 mol % of the entire $R^1$ groups.

Letter a is a positive number of 1.95 to 2.05, preferably 1.98 to 2.02. Outside the range, it is difficult to synthesize an organopolysiloxane having an average degree of polymerization of at least 100.

In the organopolysiloxane used herein as component (A), the majority of constituent units are diorganosiloxane units although triorganosiloxane units and $SiO_2$ units may be contained in an amount of less than about 1 mol % of the organopolysiloxane. Its molecular chain may be end blocked with a hydroxyl group or a triorganosiloxy group such as dimethylvinylsiloxy, trivinylsiloxy and trimethylsiloxy groups. Further, the organopolysiloxane should have a degree of polymerization of at least 100, preferably 100 to 10,000, more preferably 2,000 to 10,000, in order that a cured product have satisfactory mechanical strength. A single organopolysiloxane or a mixture of organopolysiloxanes having different substituents or different degrees of polymerization may be used as component (A).

Component (B) is a reinforcing silica filler having a specific surface area of at least 50 m$^2$/g as measured by a BET method, for example, fumed silica, fired silica, and precipitated silica, alone or in admixture of two or more. These silica fillers may be surface treated with chain-like organopolysiloxanes, cyclic organopolysiloxanes, hexamethyldisilazane, and reactive silanes. Since the surface treatment makes the reinforcing filler expensive, the surface treatment should be omitted unless it is desired to impart special properties.

Fumed silica and precipitated silica having a specific surface area of 100 to 400 m$^2$/g are especially desirable from the standpoints of the transparency and reinforcement of silicone rubber filled therewith. Reinforcing precipitated silica having a specific surface area of 50 to 800 m$^2$/g is especially desirable from the standpoints of the cost and physical properties (e.g., elasticity) of silicone rubber filled therewith.

The amount of the silica filler blended is 5 to 200 parts, preferably 10 to 50 parts by weight per 100 parts by weight of the organopolysiloxane (A). Outside the range, the resulting silicone rubber composition becomes less processable and cures into a product having insufficient mechanical strength (e.g., tensile strength and tear strength).

Component (C) is an organohydrogenpolysiloxane of the following general compositional formula (2):

$$R^2_b H_c SiO_{(4-b-c)/2} \qquad (2)$$

wherein $R^2$ is a substituted or unsubstituted monovalent hydrocarbon group, and letters b and c are positive numbers satisfying $1 \leq b \leq 2$, $0.1 \leq c \leq 1.2$, and $1.8 \leq b+c \leq 2.2$. Component (C), combined with the process limitation, serves to reduce the difference in physical properties of silicone rubber between primary vulcanization and secondary vulcanization.

$R^2$ is a substituted or unsubstituted monovalent hydrocarbon group preferably having 1 to 10 carbon atoms, more preferably 1 to 6 carbon atoms, as described for $R^1$, for example, alkyl groups such as methyl and ethyl, alkenyl groups such as vinyl and allyl, aryl groups such as phenyl, and halogen atom or cyano group substituted hydrocarbon groups thereof. Letter b is 1 to 2, preferably 1 to 1.5; c is 0.1 to 1.2, preferably 0.3 to 1, and b+c is 1.8 to 2.2. The organohydrogenpolysiloxane should have at least one hydrogen atom directly attached to a silicon atom in a molecule and may partially have a branched or three-dimensional structure.

The organohydrogenpolysiloxane (C) preferably has an average degree of polymerization of 2 to 500, especially 2 to 100. An average degree of polymerization in excess of 500 would cause difficulty in operation and uniform dispersion due to a viscosity rise.

The organohydrogenpolysiloxane (C) is added in an amount of 0.1 to 10 parts by weight, especially 0.5 to 5 parts by weight per 100 parts by weight of the organopolysiloxane (A). Less than 0.1 part fails to achieve the object whereas more than 10 parts would reduce workability and cause a cured rubber to stick to the mold.

According to the invention, the above-mentioned components (A) to (C) are used as essential components of a silicone rubber compound. That is, a silicone rubber compound is prepared by uniformly mixing components (A) to (C) in a batch-wise rubber kneading machine such as a two-roll mill, Banbury mixer, dough mixer or kneader mixer, or a continuous rubber kneading machine such as single and twin screw continuous kneaders, and subjecting the mixture to heat treatment. The order of mixing is not particularly limited insofar as components (A), (B) and (C) are subject to heat treatment together. Preferably components (A) to (C) are mixed together before heat treatment.

The heat treatment step should be done at a temperature of at least 100° C., preferably 160 to 300° C. in order that component (C) exert its effect to maximum. Particularly when a batch-wise kneading machine is used to mix and heat components (A), (B) and (C) in a batch method, the temperature is preferably in a range of 170 to 210° C. When a continuous kneading machine is used to continuously mix and heat components (A), (B) and (C), the temperature is preferably in a range of 200 to 300° C. The heat treatment time, which varies with the degree of heat release by mixing, is desirably about 5 minutes to 10 hours, more desirably about ½ to 3 hours for the batch-wise kneading machine. The residence time for the continuous kneading machine is preferably several seconds to 2 hours, more preferably 10 seconds to 1 hour. Component (C) must be subject to heat treatment simultaneously with components (A) and (B) because otherwise the object of reducing the difference in physical properties of silicone rubber between primary vulcanization and secondary vulcanization is not attained.

In order to promote the reaction between silanol groups at the surface of silica and SiH groups in component (C), a basic catalyst may be used together with components (A) to (C) upon mixing and heating them. Examples of the basic catalyst used herein include ammonium compounds such as ammonia and ammonium carbonate, silazane, inorganic acid salts such as sodium aluminate and potassium aluminate, hydroxides of metals such as lithium, sodium, potassium and cesium, and reaction products of such a metal hydroxide and a siloxane. The amount of the catalyst used is desirably 0.001 to 1 part by weight per 100 parts by weight of component (A) because too large amounts of the catalyst can adversely affect the object of the invention.

In addition to components (A) to (C), an organic silicon compound having hydroxy group at both ends of the following general formula (3) may be blended as component (D) in an amount of 0.05 to 20 parts by weight, preferably 0.1 to 5 parts by weight per 100 parts by weight of component (A) for the purpose of improving the workability of a silicone rubber compound. For the object of reducing the difference in physical properties of silicone rubber between primary vulcanization and secondary vulcanization, component (D) should preferably be added after the components (A) to (C) have been mixed and heated. If components (A) to (D) are mixed and heated together prior to the mixing and heating of components (A) to (C), the object of the invention is achieved with difficulty or not achieved. Even when component (D) is mixed with components (A) to (C) for improving blending efficiency and workability, the amount of component (D) should desirably be as small as possible.

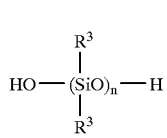

(3)

In formula (3), $R^3$, which may be identical or different, is a substituted or unsubstituted monovalent hydrocarbon group, letter n is an integer of less than 100 and may be equal to 1. More particularly, $R^3$ is a substituted or unsubstituted monovalent hydrocarbon group preferably having 1 to 10 carbon atoms, more preferably 1 to 6 carbon atoms, as described for $R^1$, for example, methyl, vinyl, phenyl, and 3,3,3-trifluoropropyl.

If necessary, a filler may be added as an extender. Examples of the filler used herein include ground quartz, diatomaceous earth, calcium carbonate, iron oxide, zinc oxide, titanium oxide, carbon black, barium oxide, magnesium oxide, cerium hydroxide, magnesium carbonate, zinc carbonate, asbestos, glass wool, finely divided mica, and fused silica powder. The addition of the filler may be done either before or after the heat treatment of components (A) to (C), preferably at a later stage in order to avoid impairing the object of the invention.

After the completion of heat treatment, various additives such as coloring agents, heat resistance modifiers, flame retardants (e.g., antimony oxide and chlorinated paraffin), antistatic agents, and heat transfer enhancers (e.g., boron nitride and aluminum oxide) may be optionally added to the silicon rubber compound as well as reaction controlling agents, mold release agents, and filling dispersants.

The silicon rubber compound can be cured into silicone rubber by blending a curing agent therein. The curing agent used herein may be either a well-known organic peroxide when the composition is peroxide crosslinked or a well-known platinum group metal catalyst when the composition is cured through hydrosilylation.

The organic peroxide may be selected from those commonly used in peroxide curing type silicone rubber compositions, for example, benzoyl peroxide, monochlorobenzoyl peroxide, di-tert-butyl peroxide, 2,5-dimethyl-di-tert-butyl peroxide, o-methylbenzoyl peroxide, p-methylbenzoyl peroxide, 2,4-dichlorobenzoyl peroxide, dicumyl peroxide, tert-butyl perbenzoate, tert-butyl peroxyisopropyl carbonate, dimyristyl peroxycarbonate, dicyclododecyl peroxydicarbonate, 2,5-bis(tert-butylperoxy)-2,5-dimethylhexane, 2,5-bis(tert-butylperoxy)-2,5-dimethylhexine, 1,6-bis(tert-butylperoxycarboxy)hexane, and other biscarbonate peroxides, alone or in admixture of two or more. The organic peroxide is usually blended in an amount of 0.01 to 3 parts, preferably 0.05 to 1 part by weight per 100 parts by weight of organopolysiloxane (A).

In the case of curing by hydrosilylation, a platinum group metal catalyst is used. Examples include platinum, palladium and rhodium compounds, with the platinum compounds being preferred. Exemplary platinum catalysts are finely divided metallic platinum catalysts as disclosed in U.S. Pat. No. 2,970,150, chloroplatinic acid catalysts as disclosed in U.S. Pat. No. 2,823,218, platinum-hydrocarbon complex compounds as disclosed in U.S. Pat. Nos. 3,159,601 and 3,159,662, chloroplatinic acid-olefin complex compounds as disclosed in U.S. Pat. No. 3,516,946, and platinum-vinyl siloxane complex compounds as disclosed in U.S. Pat. Nos. 3,775,452 and 3,814,780. The platinum group metal catalyst is usually blended in such an amount as to give 0.1 to 1,000 ppm of platinum, preferably 1 to 100 ppm of platinum based on the weight of organopolysiloxane (A) and organohydrogenpolysiloxane (C) combined.

When the platinum group metal catalyst is added to the silicone rubber compound, it is desired to previously add a reaction control agent such as methylvinylcyclotetrasiloxane and acetylene alcohol to the compound in order to ensure that the resulting silicone rubber composition has storage stability at room temperature and an appropriate pot life.

The thus obtained silicone rubber composition is molded by various techniques, for example, compression molding, extrusion molding, transfer molding and injection molding. As to the molding conditions, curing is generally achieved by heating at a temperature of about 100 to 500° C. for a time of about 10 seconds to 5 hours. Especially, primary vulcanization or curing is preferably done at about 100 to 500° C., preferably 120 to 400° C. for about 10 seconds to 30 minutes, preferably 30 seconds to 20 minutes to obtain a silicone rubber product without secondary vulcanization. Secondary vulcanization or curing which may be omitted may be done at about 150 to 250° C. for about ½ to 8 hours.

The invention has succeeded in producing a silicone rubber which remains stable during vulcanization, that is, has a minimal difference in physical properties between primary vulcanization and secondary vulcanization and which may omit secondary vulcanization.

EXAMPLE

Examples of the invention are given below by way of illustration and not by way of limitation. All parts are by weight.

Examples 1–4

Using a kneader, 100 parts of an organopolysiloxane (polysiloxane raw rubber) consisting of 99.80 mol % of $(CH_3)_2SiO$ units and 0.20 mol % of $(CH_2=CH)CH_3SiO$ units, end blocked with a dimethylvinylsilyl group, and having a degree of polymerization of 5,000 was uniformly mixed with 4 parts of a methylhydrogenpolysiloxane having a degree of polymerization of about 40 and precipitated silica (Nipsil Lp by Nippon Silica K.K.). The compound was then heat treated under the conditions shown in Table 1.

Using a dough mixer, 100 parts of the thus obtained compound was uniformly mixed with 0.7 part of 2,5-dimethyl-2,5-di(tert-butylperoxy)hexane. The compound was subject to primary curing by heating at 160° C. for 10 minutes and then to secondary curing by heating at 200° C. for 4 hours. Molded sheets with a gage of 2 mm were obtained in this way (Examples 1 to 4).

Example 5

Example 1 was repeated except that a twin screw continuous kneader (TEM 50 manufactured by Toshiba Machine Co., Ltd.) was used instead of the dough mixer and the polysiloxane raw rubber, methylhydrogenpolysiloxane and precipitated silica were heat treated at 250° C. for a residence time of 5 minutes.

The sheets were measured for rubbery physical properties according to JIS K-6301, with the results shown in Table 1.

Comparative Examples 1–4

For comparison purposes, a molded sheet was obtained by the same procedure as in Example 1 except that the heat treatment was omitted (Comparative Example 1). Another molded sheet was obtained by the same procedure as in Example 1 except that the polysiloxane raw rubber and the precipitated silica were kneaded and heat treated to form a compound, to which the 2,5-dimethyl-2,5-di(tert-butylperoxy)hexane and the methylhydrogenpolysiloxane were post added at room temperature (Comparative Example 2). These sheets were similarly measured for physical properties, with the results shown in Table 1.

Further, molded sheets were similarly obtained except that 0.5 part of calcium hydroxide and the methylhydrogenpolysiloxane were post added to 100 parts of the base compound of Comparative Example 2, and 1.5 parts of 2,4-dichlorobenzoylperoxide (silicone oil 50% paste) and 0.7 part of 2,5-dimethyl-2,5-di(tert-butylperoxy)hexane were added and mixed therewith (Comparative Examples 3 and 4). These sheets were similarly measured for physical properties, with the results shown in Table 1.

Comparative Example 5

Example 4 was repeated except that dimethylpolysiloxane having an average degree of polymerization of 10 and blocked with hydroxy group at both ends was used instead of the methylhydrogenpolysiloxane and the heat treatment was conducted at 170° C. for 2 hours. The obtained sheet was similarly measured for physical properties, with the results shown in Table 1.

TABLE 1

|  |  | E1 | E2 | E3 | CE1 | CE2 | CE3 | CE4 |
|---|---|---|---|---|---|---|---|---|
| Polysiloxane raw rubber (pbw) | | 100 | 100 | 100 | 100 | 100 | 100 | 100 |
| Precipitated silica (pbw) | | 40 | 40 | 40 | 40 | 40 | 40 | 40 |
| Methylhydrogenpolysiloxane (pbw) | | 4 | 4 | 4 | 4 | — | — | — |
| Heat treatment | Time (hr.) | 2 | 1 | 1 | — | 2 | 2 | 2 |
| | Temp. (° C.) | 150 | 150 | 100 | — | 150 | 150 | 150 |
| Methylhydrogenpolysiloxane post added (pbw) | | — | — | — | — | 4 | 4 | 4 |
| $Ca(OH)_2$ post added (pbw) | | — | — | — | — | — | 0.5 | 0.5 |
| Primary curing | Hardness (JIS) | 57 | 55 | 53 | 55 | 55 | 56 | 54 |
| | Tensile strength ($kgf/cm^2$) | 72 | 73 | 69 | 71 | 62 | 60 | 58 |
| | Elongation (%) | 310 | 330 | 380 | 430 | 400 | 360 | 370 |
| | Resilience (%) | 75 | 74 | 75 | 70 | 75 | 68 | 73 |

TABLE 1-continued

|   |   |   |   |   |   |   |   |   |
|---|---|---|---|---|---|---|---|---|
| | Compression set (%) | 5.5 | 6.3 | 8.8 | 15.0 | 16.3 | 35.3 | 18.5 |
| | Appearance | | | transparent/translucent | | | white | white |
| Secondary curing | Hardness (JIS) | 57 | 56 | 54 | 58 | 59 | 58 | 59 |
| | Tensile strength (kgf/cm²) | 68 | 70 | 75 | 63 | 59 | 63 | 55 |
| | Elongation (%) | 300 | 350 | 390 | 360 | 350 | 340 | 320 |
| | Resilience (%) | 74 | 76 | 75 | 67 | 73 | 63 | 71 |
| | Compression set (%) | 2.6 | 3.8 | 4.3 | 6.5 | 7.5 | 21.4 | 8.8 |
| | Appearance | translucent | translucent | translucent | somewhat yellowed | translucent | white | white |

|   |   | E4 | CE5 | E5 |
|---|---|---|---|---|
| Polysiloxane raw rubber (pbw) | | 100 | 100 | 100 |
| Precipitated silica (pbw) | | 40 | 40 | 40 |
| Methylhydrogenpolysiloxane (pbw) | | 4 | — | 4 |
| Dimethylpolysiloxane blocked with hydroxy groups at both ends (pbw) | | — | 4 | — |
| Heat treatment | Time (hr.) | 2 | 2 | 5 minutes* |
| | Temp. (° C.) | 170 | 170 | 250 |
| Primary curing | Hardness (JIS) | 56 | 53 | 53 |
| | Tensile strength (kgf/cm²) | 74 | 58 | 75 |
| | Elongation (%) | 320 | 440 | 360 |
| | Resilience (%) | 74 | 65 | 75 |
| | Compression set (%) | 4.8 | 25.0 | 3.7 |
| | Appearance | transparent/translucent | white | transparent/translucent |
| Secondary curing | Hardness (JIS) | 56 | 57 | 53 |
| | Tensile strength (kgf/cm²) | 71 | 63 | 72 |
| | Elongation (%) | 330 | 450 | 350 |
| | Resilience (%) | 75 | 69 | 76 |
| | Compression set (%) | 2.3 | 11.9 | 2.1 |
| | Appearance | translucent | white | transiticent |

Note:
primary curing at 160° C. for 10 minutes
secondary curing at 200° C. for 4 hours
compression set at 150° C. for 22 hours
*residence tirne

Examples 6–8 & Comparative Example 6

A molded sheet was obtained as in Example 1 except that 0.1 part of sodium aluminate was added to the compound, mixed therewith and heat treated (Example 6). Another molded sheet was obtained as in Example 1 except that dry silica (Aerosil 200 by Nippon Aerosil K.K., specific surface area 200 m²/g) was used instead of the precipitated silica (Example 7). A further molded sheet was obtained as in Example 6 except that the heat treatment was conducted at 170° C. for 2 hours (Example 8). These sheets were similarly measured for physical properties.

For comparison purposes, a molded sheet was obtained as in Example 1 except that 4 parts of a dimethylpolysiloxane blocked with a hydroxyl group at each end and having a degree of polymerization of about 20 was used instead of the hydrogenpolysiloxane (Comparative Example 6). The sheet was similarly measured for physical properties.

TABLE 2

|   |   | E6 | E7 | E8 | CE6 |
|---|---|---|---|---|---|
| Polysiloxane raw rubber (pbw) | | 100 | 100 | 100 | 100 |
| Precipitated silica (pbw) | | 40 | — | 40 | 40 |
| Dry silica (pbw) | | — | 35 | — | — |
| Methylhydrogenpolysiloxane (pbw) | | 4 | 4 | 4 | — |
| Both end hydroxyl-terminated dimethylorganopolysiloxane (pbw) | | — | — | — | 4 |
| Sodium aluminate (pbw) | | 0.1 | — | 0.1 | — |
| Heat treatment | | 150° C./2 hours | 150° C./2 hours | 170° C./2 hours | 150° C./2 hours |
| Primary curing | Hardness (JIS) | 55 | 54 | 55 | 53 |
| | Tensile strength (kgf/cm²) | 69 | 86 | 71 | 56 |
| | Elongation (%) | 330 | 360 | 340 | 460 |
| | Restitution (%) | 74 | 69 | 75 | 64 |
| | Compression set (%) | 4.8 | 7.8 | 4.1 | 28.5 |
| Secondary curing | Hardness (JIS) | 56 | 56 | 55 | 58 |
| | Tensile strength (kgf/cm²) | 73 | 83 | 73 | 61 |

TABLE 2-continued

|  | E6 | E7 | E8 | CE6 |
|---|---|---|---|---|
| Elongation (%) | 340 | 330 | 360 | 430 |
| Restitution (%) | 76 | 67 | 76 | 70 |
| Compression set (%) | 2.3 | 5.8 | 2.3 | 13.5 |

Note:
primary curing at 160° C. for 10 minutes
secondary curing at 200° C. for 4 hours
compression set at 150° C. for 22 hours Examples 9–10

A molded sheet was obtained as in Example 1 except that 1 part of a dimethylpolysiloxane blocked with a hydroxyl group at each end and having a degree of polymerization of about 20 was post added (Example 9). Another molded sheet was obtained as in Example 1 except that a methylhydrogensiloxane copolymer consisting of 12 dimethylsiloxane units and 5 methylhydrogensiloxane units and end blocked with a trimethylsilyl groups was used instead of the methylhydrogenpolysiloxane (Example 10). These sheets were similarly measured for physical properties. The results are shown in Table 3.

TABLE 3

|  |  | E9 | E10 |
|---|---|---|---|
| Polysiloxane raw rubber (pbw) |  | 100 | 100 |
| Precipitated silica (pbw) |  | 40 | 40 |
| Methylhydrogenpolysiloxane (pbw) |  | 4 | — |
| Methylhydrogenpolysiloxane copolymer (pbw) |  | — | 4 |
| Heat treatment time @150° C. (hr.) |  | 2 | 2 |
| Both end hydroxyl-terminated dimethylorganopolysiloxane post added (pbw) |  | 1 | — |
| Primary curing | Hardness (JIS) | 55 | 55 |
|  | Tensile strength (kgf/cm²) | 78 | 78 |
|  | Elongation (%) | 350 | 370 |
|  | Restitution (%) | 74 | 72 |
|  | Compression set (%) | 5.4 | 6.8 |
| Secondary curing | Hardness (JIS) | 56 | 57 |
|  | Tensile strength (kgf/cm²) | 75 | 73 |
|  | Elongation (%) | 340 | 320 |
|  | Restitution (%) | 73 | 74 |
|  | Compression set (%) | 2.8 | 5.2 |

Note:
primary curing at 160° C. for 10 minutes
secondary curing at 200° C. for 4 hours
compression set at 150° C. for 22 hours Example 11 & Comparative Example 7

A compound was obtained by mixing the polysiloxane raw rubber, precipitated silica, and methylhydrogenpolysiloxane copolymer and heat treating the mixture as in Example 10. To 100 parts of the compound were added 0.1 part of ethynyl cyclohexanol and 0.2 part of a platinum catalyst in the form of an octyl alcohol modified chloroplatinic acid solution having a platinum concentration of 2% by weight. The compound was subject to primary curing by heating at 160° C. for 10 minutes and then to secondary curing by heating at 200° C. for 4 hours. A molded sheet with a gage of 2 mm was obtained in this way (Example 11).

For comparison purposes, a molded sheet was produced as above except that the methylhydrogenpolysiloxane was post added to the compound (Comparative Example 7).

These sheets were similarly measured for physical properties. The results are shown in Table 4.

TABLE 4

|  |  | E11 | CE7 |
|---|---|---|---|
| Polysiloxane raw rubber (pbw) |  | 100 | 100 |
| Precipitated silica (pbw) |  | 40 | 40 |
| Methylhydrogenpolysiloxane copolymer (pbw) |  | 4 | — |
| Heat treatment time @150° C. (hr.) |  | 2 | 2 |
| Methylhydrogenpolysiloxane copolymer post added (pbw) |  | — | 4 |
| Primary curing | Hardness (JIS) | 57 | 59 |
|  | Tensile strength (kgf/cm²) | 78 | 69 |
|  | Elongation (%) | 380 | 420 |
|  | Restitution (%) | 73 | 71 |
|  | Compression set (%) | 8.1 | 18.8 |
| Secondary curing | Hardness (JIS) | 58 | 63 |
|  | Tensile strength (kgf/cm²) | 75 | 61 |
|  | Elongation (%) | 340 | 310 |
|  | Restitution (%) | 75 | 74 |
|  | Compression set (%) | 9.3 | 11.6 |

Note:
primary curing at 160° C. for 10 minutes
secondary curing at 200° C. for 4 hours
compression set at 150° C. for 22 hours Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a silicone rubber from a silicone rubber compound comprising (A) 100 parts by weight of an organopolysiloxane of the following general compositional formula (1):

$$R^1_a SiO_{(4-a)/2} \tag{1}$$

wherein $R^1$ is a substituted or unsubstituted monovalent hydrocarbon group, 0.001 to 0.5 mol % of $R^1$ being an alkenyl group, and letter a is a positive number of 1.95 to 2.05, the organopolysiloxane having an average degree of polymerization of at least 100, (B) 5 to 200 parts by weight of a reinforcing silica filler having a specific surface area of at least 50 m²/g as measured by a BET method, and (C) 0.1 to 10 parts by weight of an organohydrogenpolysiloxane of the following general compositional formula (2):

$$R^2_b H_c SiO_{(4-b-c)/2} \tag{2}$$

wherein $R^2$ is a substituted or unsubstituted monovalent hydrocarbon group, and letters b and c are positive numbers satisfying $1 \leq b \leq 2$, $0.1 \leq c \leq 1.2$, and $1.8 \leq b+c \leq 2.2$, said method comprising the steps of:
mixing component (C) with components (A) and (B) and heating them at a temperature of at least 100° C. to form the silicone rubber compound,
adding an organic peroxide or a platinum group metal catalyst to the compound, and
crosslinking the compound.

2. The method of claim 1 wherein the organopolysiloxane (A) has an average degree of polymerization of 2,000 to 10,000.

3. The method of claim 1 wherein the temperature of heating the mixture of components (A), (B) and (C) is in the range of from 160° C. to 300° C.

4. The method of claim 3 wherein a batch-wise kneading machine is used to mix and heat components (A), (B) and (C) at 170 to 210° C.

5. The method of claim 3 wherein a continuous kneading machine is used to mix and heat components (A), (B) and (C) at 200 to 300° C.

6. A method for preparing a silicone rubber from a silicone rubber compound comprising
(A) 100 parts by weight of an organopolysiloxane of the following general compositional formula(1):

$$R^1{}_a SiO_{(4-a)/2} \qquad (1)$$

wherein $R^1$ is a substituted or unsubstituted monovalent hydrocarbon group, 0.001 to 0.5 mol % of $R^1$ being an alkenyl group, and letter a is a positive number of 1.95 to 2.05, the organopolysiloxane having an average degree of polymerization of at least 100, (B) 5 to 200 parts by weight of a reinforcing silica filler having a specific surface area of at least 50 m²/g as measured by a BET method, and (C) 0.1 to 10 parts by weight of an organohydrogenpolysiloxane of the following general compositional formula (2):

$$R^2{}_b H_c SiO_{(4-b-c)/2} \qquad (2)$$

wherein $R^2$ is a substituted or unsubstituted monovalent hydrocarbon group, and letters b and c are positive and numbers satisfying $1 \leq b \leq 2$, $0.1 \leq c \leq 1.2$, and $1.8 \leq b+c \leq 2.2$, said method comprising the steps of:
mixing component (C) with components (A) and (B) and heating them at a temperature of at least 100° to form the silicone rubber compound,
adding an organic peroxide or a platinum group metal catalyst to the compound, and
crosslinking the compound,
wherein 0.001 to 1 part by weight of a basic catalyst per 100 parts by weight of component (A) is added to components (A), (B) and (C) to be mixed and heated therewith.

7. The method of claim 1 wherein an organic silicon compound having hydroxy groups at both ends represented by the following formula (3):

$$HO-(SiO)_n-H \atop {R^3 \atop R^3}} \qquad (3)$$

wherein $R^3$ is a substituted or unsubstituted monovalent hydrocarbon group and letter n is an integer of 1 to 99 is added to the mixture of components (A), (B) and (C) in an amount of 0.05 to 20 parts by weight per 100 parts by weight of component (A) after the mixture of components (A), (B) and (C) is heat treated.

8. A method for preparing a silicone rubber from a silicone rubber compound comprising
(A) 100 parts by weight of an organopolysiloxane of the following general compositional formula (1):

$$R^1{}_a SiO_{(4-a)/2} \qquad (1)$$

wherein $R^1$ is a substituted or unsubstituted monovalent hydrocarbon group, 0,001 to 0.5 mol % of $R^1$ being an alkenyl group, and letter a is a positive number of 1.95 to 2.05, the organopolysiloxane having an average degree of polymerization of at least 100, (B) 5 to 200 parts by weight of a reinforcing silica filler having a specific surface area of at least 50 m²/g as measured by a BET method, and (C) 0.1 to 10 parts by weight of an organohydrogenpolysiloxane of the following general compositional formula (2):

$$R^2{}_b H_c SiO_{(4-b-c)/2} \qquad (2)$$

wherein $R^2$ is a substituted or unsubstituted monovalent hydrocarbon group, and letters b and c are positive and numbers satisfying $1 \leq b \leq 2$, $0.1 \leq c \leq 1.2$, and $1.8 \leq b+c \leq 2.2$, said method comprising the steps of:
mixing component (C) with components (A) and (B) and heating them at a temperature of at least 100° to form the silicone rubber compound,
adding an organic peroxide or a platinum group metal catalyst to the compound, and
crosslinking the compound,
wherein an organic silicon compound having hydroxy groups at both ends represented by the following formula (3):

$$HO-(SiO)_n-H \atop {R^3 \atop R^3}} \qquad (3)$$

wherein $R^3$ is a substituted or unsubstituted monovalent hydrocarbon group and letter n is an integer of 1 to 99 is added to the mixture of components (A), (B) and (C) in an amount of 0.05 to 20 parts by weight per 100 parts by weight of component (A) after the mixture of components (A), (B) and (C) is heat treated,
wherein the silicone rubber compound to which the organic peroxide or platinum group metal catalyst is added is subjected to primary vulcanization to obtain a silicone rubber product without secondary vulcanization.

9. The method of claim 1 wherein an organic peroxide is added to said silicone rubber compound.

10. The method of claim 1 wherein a platinum group metal catalyst is added to said silicone rubber compound.

* * * * *